United States Patent [19]

Kronseder

[11] Patent Number: 4,880,098

[45] Date of Patent: Nov. 14, 1989

[54] RECEPTACLE HANDLING MACHINE

[76] Inventor: Hermann Kronseder, P.O. Box 1230, 8402 Neutraubling, Fed. Rep. of Germany

[21] Appl. No.: 161,172

[22] Filed: Feb. 24, 1988

[30] Foreign Application Priority Data

Feb. 26, 1987 [DE] Fed. Rep. of Germany ....... 8702940
Aug. 12, 1987 [DE] Fed. Rep. of Germany ....... 8710999

[51] Int. Cl.[4] .............................................. B65G 47/00

[52] U.S. Cl. .............................. 198/346.2; 198/480.1; 198/481.1; 198/836; 141/146; 156/567

[58] Field of Search ............... 198/346.2, 467.1, 480.1, 198/481.1, 636, 637, 599, 836; 141/145, 146, 152; 156/567

[56] References Cited

U.S. PATENT DOCUMENTS

| | | | |
|---|---|---|---|
| 3,669,244 | 6/1972 | Pagoin et al. | 198/599 |
| 3,989,137 | 11/1976 | Ward | 198/836 |
| 4,225,035 | 9/1980 | Mohney et al. | 198/836 |
| 4,721,544 | 1/1988 | Zodrow et al. | 156/567 |

FOREIGN PATENT DOCUMENTS

| | | | |
|---|---|---|---|
| 2207087 | 8/1973 | Fed. Rep. of Germany . | |
| 3217526 | 11/1983 | Fed. Rep. of Germany . | |
| 1459406 | 11/1966 | France | 198/481.1 |

OTHER PUBLICATIONS

"ABC for Labelling Machine Operators", Krones pamphlet cited by applicant.

"ABC for Canmatic Labelling Machine Operators", Krones pamphlet cited by applicant.

*Primary Examiner*—Joseph E. Valenza
*Attorney, Agent, or Firm*—James E. Nilles; Donald C. McGaughey

[57] ABSTRACT

A receptacle handling machine for the handling of receptacles which are passed through the machine and having a machine frame and at least one receptacle guiding body releasably mounted on the machine frame, the guiding body on its end adjacent the frame is formed with first insertion and stop elements to respectively engage in pairs, in the assembled state, associated second insertion and stop elements of the machine frame. The guiding body is positively held transversely to the direction of insertion and a clamping member is attached to the guiding body or to the machine frame. The guiding body is held either non-positively or positively in the direction of insertion together with the stop elements.

13 Claims, 12 Drawing Sheets

RECEPTACLE HANDLING MACHINE

This invention refers to a receptacle handling machine for the handling of receptacles which are passed through the machine, comprising a machine frame and at least one receptacle guiding body releasably mounted on the machine frame.

BACKGROUND OF THE INVENTION

Counted among such receptacle handling machines are, for example inspecting-, labelling- or filling machines. The guiding bodies here serve to pass the incoming and outgoing receptacles, respectively, into the machine and onto the rotary table and after processing, from the rotary table to the subsequent transport means. On the subsequent transport means the guiding bodies may also have the form of guide rails. As the receptacle handling machine is meant to be suitable for the processing of various container sizes, some changes will have to be made when processing is converted to other container shapes. For example, when the new containers differ in diameter, the star shaped wheels including the associated guiding bodies in the form of arc-shaped guiding members require to be replaced.

So far the guiding bodies have been attached to the machine frame by means of screws in a more or less complicated manner. To facilitate the loosening of the screws, the latter are often provided with handwheels. If, however, in filling operations the types of receptacles used frequently change, the long changeover times involved by the complicated screwing and unscrewing operations of the guiding bodies will be disadvantageous.

SUMMARY OF THE INVENTION

Consequently, it is an object of the present invention to improve a receptacle handling machine of the type set forth in the introduction so as to enable the guiding bodies to be easily handled and quickly replaced, with the fastening of the guiding bodies being constructionally simple.

This object is attained according to the invention by the characteristic that on the end facing the machine frame when assembled, the guiding body is formed with first insertion- and stop elements to respectively engage in pairs, in the assembled state, associated second insection- and stop elements, so that by the pair-wise engaged insertion elements the guiding body is positively held transversely to the direction of insertion, and by the characteristic that a clamping member is attached to the guidling body or the machine frame with the aid of which the guiding body is held either non-positively or positively in the direction of insertion together with the stop elements.

This solution is simple as to construction and now enables the guiding bodies to be fastened by merely inserting the latter substantially horizontally with their insertion- and stop elements into the second insertion- and stop elements of the machine frame and afterwards, clamping them together with the aid of the clamping member. Replacing the guiding bodies, particularly when larger and thus heavier ones are employed, is consequently more comfortable. Centering of the guiding bodies in the receptacle handling machine according to the invention is accomplished by the insertion- and stop elements positively engaged in pairs.

In a constructionally simple embodiment, the insertion- and stop elements may respectively be constructed as one piece. As a result, the exactness in the fastening of the guiding body is moreover even increased.

In accordance with a preferred embodiment, the first insertion- and stop elements are disposed on the bottom side of the guiding body as the latter usually rests on the machine frame with the bottom side thereof.

For the same reason, another advantage will result when the second insertion- and stop elements designed as counterparts are mounted on the top side of the machine frame.

To an exact and reliable fastening of the guiding bodies it will be advantageous when each guiding body is provided with at least two insertion- and stop elements. Together with the clamping bolt the guiding body is held at three points with respect to the direction of insertion, what is sufficient for an exact fixing of the guiding body.

When larger guiding bodies are employed, for example double-arched guiding members between two bottle stars, the provision of three insertion- and stop elements on the guiding bodies will be advantageous.

A constructionally particularly simple configuration of the fastening elements for the guiding body results from the fact that the first or second insertion- and stop element is formed with a substantially U-shaped insertion portion, the edges of which are undercut. The two U-legs here act as a guide for the insertion- and stop element formed as a counterpart, while the U-bottom serves as a stop for the counterpart. It is thus possible to simple push the counterpart from the open end of the U-shaped insertion portion along the U-legs to the U-bottom. As the edges of the insertion portion are undercut, the counterpart engages therebehind, so that any movement of the engaged insertion- and stop elements transversely to the direction of insertion is positively prevented.

To allow the fastening elements to be, for example subsequently, also attached in simple manner to either the bottom side of the guiding body or the top side of the machine frame, it will be advantageous when the first or second insertion- and stop element is provided in the form of a screw-down plate which is bent at right angles with respect to the edges of the insertion portion thus forming the undercut of the edges. A screw-down plate of this kind can be fixed in simple manner by means of centering pins accommodated in the bottom side of the guiding body, and can be fastened with the aid of customary fastening screws. The same steps can be also taken on the top side of the machine frame.

In accordance with a further embodiment of the invention, the first or second insertion- and stop element may be formed of one piece with the bottom side of the guiding body or the top side of the machine frame. This arrangement is to be preferred when the receptacle handling machine is equipped with guiding bodies of this kind from the very beginning.

It is advantageous when the second insertion- and stop element formed as a counterpart or the first insertion- and stop element is designed as a collar bolt whose bolt diameter is adapted to the width of the insertion portion of the associated first or second insertion- and stop element and whose collar fits behind the undercut edges of the insertion portion when the guiding body is assembled. A positive engagement between two associated first and second insertion- and stop elements is thus ensured in simple manner.

Another advantage will result when spaced apart from the collar at a distance of about the thickness of the edges of the insertion portion, the collar bolt is formed with a clamping shoulder which contacts the edge of the insertion portion when the guiding body is assembled. The edges of the insertion portion can so be clamped between the collar and the clamping shoulder of the collar bolt, so that any relative movement between the edge of the insertion portion and the bolt transversely to the direction of insertion of the guidling body is excluded.

In order to be capable of exactly adjusting the distance between the collar and the clamping shoulder of the collar bolt to the thickness of the edges of the insertion portion, it will be advantageous when the clamping shoulder is constructed in such a manner that it forms the face end of a nut screwed onto an external thread of the collar bolt.

It is advantageous when the collar bolt has a throughgoing internal thread. This enables the collar bolt to be mounted to either the machine frame or the guiding body in simple manner with the aid of a conventional fastening screw.

A simple locking of the guiding body already inserted up to the stop can be achieved by designing the clamping bolt as a clamping screw which is oriented in the direction of insertion of the guiding body and by which a clamping disc is supported eccentrically with respect to the screw axis, the clamping disc being pivotable about the screw axis from a release position into a locking position in which it fits behind the guiding body. The insertion- and stop elements of the guiding body and the insertion- and stop elements of the machine frame are so clamped together in the direction of insertion and are locked against any movement in or opposite to the direction of insertion.

It will be particularly advantageous when a hand lever is secured to the clamping screw for rotation therewith and the clamping disc is rotatably mounted on the clamping screw in release position, with a stop pin being attached to either the guiding body or the machine frame to prevent a complete turn of the clamping disc. The clamping screw can thus be turned in simple manner with the hand lever. As soon as the hand lever reaches the clamping disc, the latter is also moved in the direction of rotation as a consequence of the friction between clamping disc and hand lever until it reaches the locking position in which it is held by the stop pin. As the clamping screw is further tightened, the clamping disc is firmly pressed against the guiding body. When the clamping screw is loosened, the clamping disc is again also moved into the release position as a consequence of the friction between clamping disc and hand lever, and by reason of gravity then remains hanging downwards. The clamping bolt can so be operated with one hand.

In accordance with a further preferred embodiment, the guiding body rests on an insertion rail secured to the machine frame with a slidably guiding section provided on the bottom side of the guiding body. A particularly force-saving assembly and disassembly of the guiding body is so attained and consequently, this arrangement is particularly suitable for guiding bodies used between stars for incoming and outgoing receptacles.

Preferably, the guiding body is forced against the insertion rail with an edge facing the machine centre in the direction of insertion by means of a holding down device mounted on the machine frame and open in a direction opposite to the direction of insertion. This simple measure has the effect that the edge of the guiding body located at the end of the insertion rail is pressed against the machine frame already after the guiding body has been brought into its assembled state, thus preventing the edge of the guiding body from lifting.

To further facilitate the insertion of the guiding body, it will be advantageous when the holding down device has an inclined insertion portion.

In accordance with a further embodiment of the invention, spigots are centering on and fastened to the bottom side of the guiding body to engage corresponding holes provided on the machine frame. A particularly simple arrangement of the centering elements is thus attained.

Replacement ease of the guiding body is further favoured by the characteristic that an edge of the guiding body facing the machine exterior ,and the machine frame are clamped together by means of the clamping elements. It follows that the clamping elements are easily accessible.

In accordance with a preferred embodiment of the invention, the clamping elements are designed in such a manner that they form abutments for the centering spigots and to this effect are provided with holes receiving the centering spigots. The clamping element and the abutment for the centering spigots so form a constituent which, on the one hand, simplifies the construction of the machine and, on the other hand, makes a separate aligning of the clamping elements superfluous.

An improvement of the invention provides that transversely to the hole an opening extends through the abutment in which a slide is arranged which is shiftable transversely to the hole and also comprises a hole of like diameter, the hole of the slide being almost in alignment with the hole of the abutment to receive the centering spigot. The centering spigot inserted in the abutment is clamped against the abutment by the slide, so that the guiding body is clamped against the machine frame in the area of the centering spigots. This is simple and a particularly time-saving fastening and replacing of the guiding body is so ensured.

A simple possibility of clamping the slide against the abutment results from the fact that the slide is provided with a clamping screw supported by the abutment and extending in shifting direction. Turning the clamping screw at the same time causes the slide to move in the opening of the abutment and consequently, when the centering spigot is inserted, the latter is clamped against the abutment.

It is also advantageous when the clamping elements are designed as abutments for the centering spigots and have a hole to receive the centering spigots, with a treaded hole being disposed in the abutment to extend transversely to the hole and open thereinto. In the threaded hole a clamping screw is provided which acts on the centering spigot. The centring spigot can so be easily clamped against the abutment, without it being necessary to provide a slide.

Another advantageous possibility of clamping the centering spigot results when the slide is provided with an eccentric which in shifting direction is supported by the abutment.

In accordance with a further embodiment of the invention, the clamping elements are constructed as knee layers. Knee levers of this kind already ensure an extremely high clamping effect although only little force is involved.

It is advantageous when a clamping element includes a U-shaped clamp to encompass the edges of the guiding body and the machine frame one lying on top of the other, with a clamping lever being pivotably mounted on the lower, horizontal leg of the clamp to press, in clamping position, the two edges together against the the upper, horizontal leg of the clamp. As the guiding body and the machine frame are clamped together, the clamping lever is pivoted about its point of mounting until the dead point, where the clamping lever is in instable equilibrium, is exceeded. This has the effect that in clamping position, the clamping lever cooperating with the clamp as a knee lever, is held in stable position. Depending on material properties, the clamp is made of elastically yielding steel.

The clamping position of the knee lever can advantageously be stabilized by a stop which is secured to the machine frame and restricts pivoting of the clamping lever in direction towards the clamping position. As a matter of fact the stop is not effective until the clamping lever has already exceeded the position of maximum load.

It is further advantageous that the clamping lever is eccentrically mounted. This characteristic has the effect that the clamping lever end which can be gripped, directs substantially vertically downwards even in its clamping position i.e. when the position of maximum load is already exceeded. The clamping lever does not project from the machine and consequently, offers no additional source of danger.

Embodiments of the invention shall hereinafter be depicted in more detail on the basis of a drawing, wherein

DESCRIPTION OF THE PREFERRED EMBODIMENTS

Figure 1:
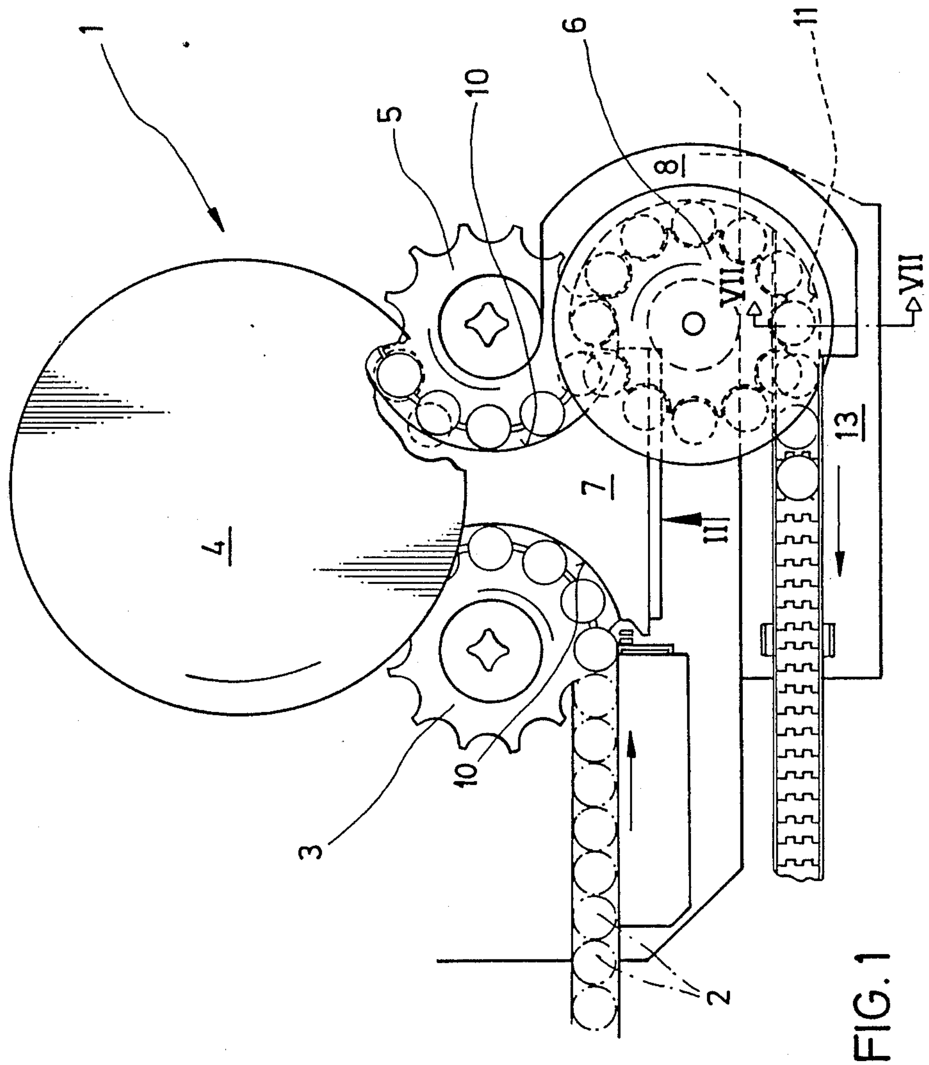
FIG. 1 is a diagrammatic top view of a receptacle handling machine including arc-shaped guiding members.

FIG. 1 is a diagrammatic top view upon a receptacle handling machine 1, here, a machine for the handling and processing of bottles 2. For the sake of clarity, the processing units are not shown in detail. What is apparent, however, is that the bottles 2 are passed in a single row of bottles from the lefthand side in the direction of the arrow around a first bottle star 3 to a rotor 4, and through second and third bottle stars 5 and 6, respectively, discharged again as a row of bottles. The individual bottle stars 3, 5 and 6 are completed by arc-shaped guiding members or bodies 7 and 8 which cause the bottles 2 to be deflected in accordance with bottles stars 3, 5 and 6.

Figure 3:
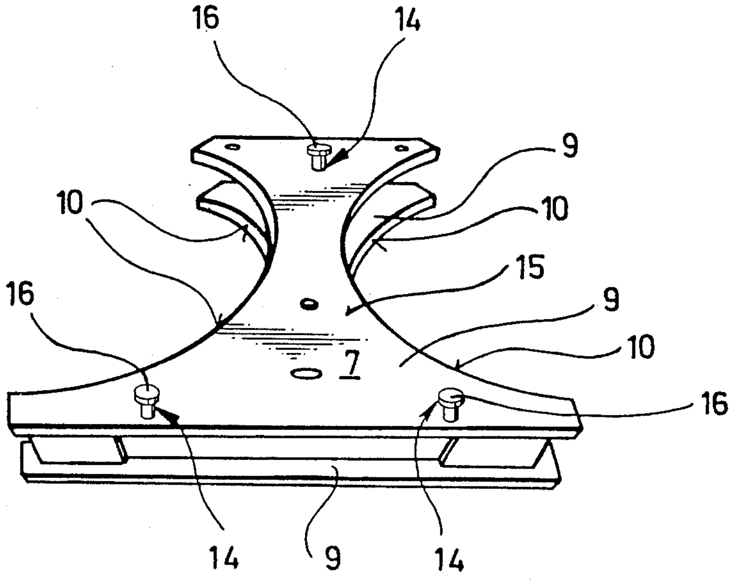
FIG. 3 is a view showing the bottom side of an arc-shaped guiding member according to a first embodiment.

The first arc-shaped guiding member 7, the bottom side of which is illustrated in FIG. 3, is associated with both the first bottle star 3 and the second bottle star 5 and includes two plates 9, which are arranged one on top of the other and whose edges 10 are adapted to the radius of curvature of the bottle stars 3 and 5.

The arc-shaped guiding member 8 is only associated with one bottle star, namely third bottle star 6 and consequently, is substantially of crescent-like configuration. Like the first arc-shaped guiding member 7, arc-shaped guiding member 8 comprises two plates 11 arranged one on top of the other and having edges 12 which are adapted to the radius of curvature of the third bottle star 6 (cf. FIG. 7).

Figure 2:
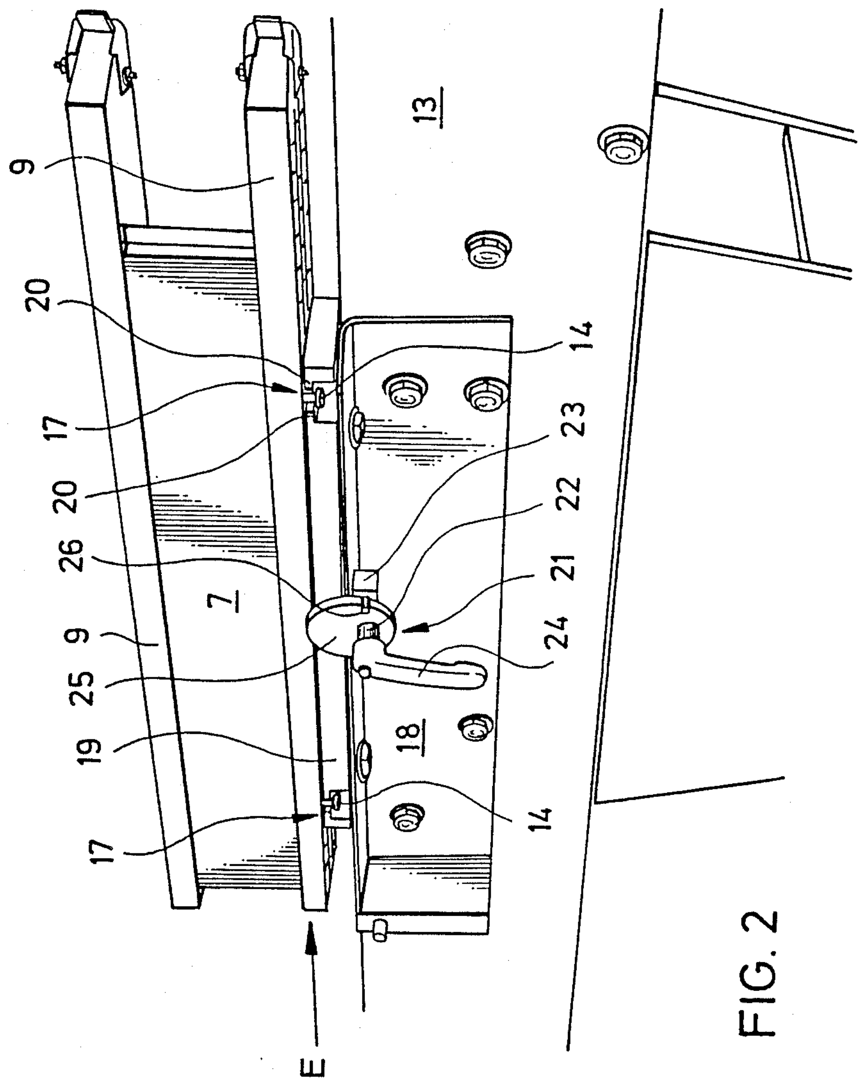
FIG. 2 is a view upon a part of the receptacle handling machine shown in FIG. 1, which is taken in the direction of arrow II.

As can particularly clearly be seen from FIG. 2, the arc-shaped guiding members 7 and 8 are fastened to a machine frame 13.

The sides of the arc-shaped guiding members 7 and 8 and the machine frame 13 which respectively face one another are formed with insertion- and stop elements which are used as fastening elements and respectively engage each other in pairs in the assembled state.

In a first embodiment shown in FIGS. 2 and 3, the bottom side of the arc-shaped guiding member 7 is formed with first insertionand stop elements in the form of collar bolts 14. In addition to their normal bolt body, said collar bolts 14 are characterized by a collar 16 which is spaced apart from the bottom side 15 of the arc-shaped guiding member 7.

The associated second insertion- and stop elements on the machine frame 13, as can be seen from FIG. 2, are substantially provided as fixing slots 17 in a plate 19 secured to the machine frame 13 by means of an angular sheet metal 18. To this effect, the fixing slots 17 have a substantially U-shaped insertion portion whose edges 20 are undercut by the transverse section of the fixing slot. Consequently, the edges 20 protrude towards the centre of the U-shaped insertion portion. The bottom of the insertion portion, which is not shown in FIG. 2, substantially resembles the bottom of the insertion- and stop elements shown in FIGS. 4 and 6, which will be explained as the description proceeds.

As is apparent from FIG. 2, the diameter of the collar bolt corresponds to the distance between two opposing edges 20 of a fixing slot 17, while the distance between the collar 16 of the collar bolt 14 and the bottom side 15 of the arc-shaped guiding member 7 corresponds to about the thickness of the edges 20 of the fixing slots 17. It can be seen that collar 16 of collar bolt 14 engages behind the edges 20 of the fixing slots 17 in the assembled state of the arc-shaped guilding member 7 illustrated in FIG. 2. It follows that the engaged insertion- and stop elements, on the one hand, constructed as collar bolts 14 and, on the other hand, as fixing slots 17 are effective to positively hold the arc-shaped guiding member 7 transversely to the direction of insertion E of the latter.

FIG. 2 further shows a clamping member or element formed as clamping bolt 21 which acts in the direction of insertion E and together with the collar bolts 14 and the fixing slots 17 positively holds the arc-shaped guiding member 7 also with respect to the direction of insertion.

The clamping bolt 21 shown in FIG. 2 includes a clamping screw 22 whose screw axis extends in the direction of insertion E. Below plate 19, the clamping screw 22 is supported by an abutment 23 of the angular metal sheet 18. At the end remote from the abutment 23 the clamping screw 22 is provided with a hand lever 24. Between hand lever 24 and abutment 23 a clamping disc 25 is eccentrically mounted on the clamping screw 22 and independent of whether or not the clamping screw 22 is turned, can be swung with respect to the clamping screw from a release position into a locking position (cf. FIG. 2). A stop pin 26 is attached to the abutment 23 to prevent the clamping disc 25 from being swung beyond the locking position.

It shall hereinafter be depicted in more detail how the first embodiment of the invention operates.

As can be seen from FIG. 3, the bottom side 15 of the arc-shaped guiding member 7 has three collar bolts 14. The machine frame 13 is provided with three fixing slots 17 matching the collar bolts 14, of which slots only two are shown in FIG. 2. After the arc-shaped guiding member 7 has been turned bottom side 15 down, it can be pushed with its collar bolts 14 into the fixing slots 17 until the collar bolts 14 abut against the end of the fixing slots 17 which is not shown in FIG. 2.

The clamping bolt 21 is then brought into the locking position by turning the clamping screw 22 in clockwise direction. Turning the hand lever 24 has the effect that by reason of the frictional force between the clamping disc 25 and the hand lever 24, the clamping disc 25 is also turned in clockwise direction until the stop pin 26 prevents a further rotation of the clamping disc 25 which then is in the locking position shown in FIG. 2. As the clamping screw 22 is further tightened, the clamping disc 25 is urged against the lower plate 19 of the arc-shaped guiding member 7, whereby the collar bolts 14 are pushed into the fixing slots 17 to such an extent that any play disappears from the connection between collar bolts 14 and fixing slots 17. The arc-shaped guiding member 7 is already fastened. To disassemble the arc-shaped guiding member 7, the sequence of the steps described hereinbefore is just reversed, by simply loosening the clamping screw 22, the clamping disc 25 turning downwards in counter-clockwise direction by reason of the frictional force between the hand lever 24 and the clamping disc 25 without any further manipulation being required. As a consequence of gravity, the clamping disc 25 remains hanging downwards and the turning of the clamping disc 25 does not continue as the clamping screw 22 is further loosened. As soon as the clamping disc 25 is hanging downwards, unscrewing of the clamping screw 22 can be stopped anyway. The arc-shaped guiding member 7 can now be removed horizontally from the machine frame 13 and replaced by a new arc-shaped guiding member. This arc-shaped guiding member is fastened as described hereinbefore.

FIGS. 4 to 7 show a further embodiment of the present invention.

As for the principle, the insertion- and stop elements are interchanged i.e. the collar bolts 14 are now mounted on the top side of the machine frame 13, while the plates 19 formed with the insertion portion are attached to the bottom side 15 of the arc-shaped guiding member 8. Therefore, constituents having the same function also have the same reference numerals.

Figure 7:
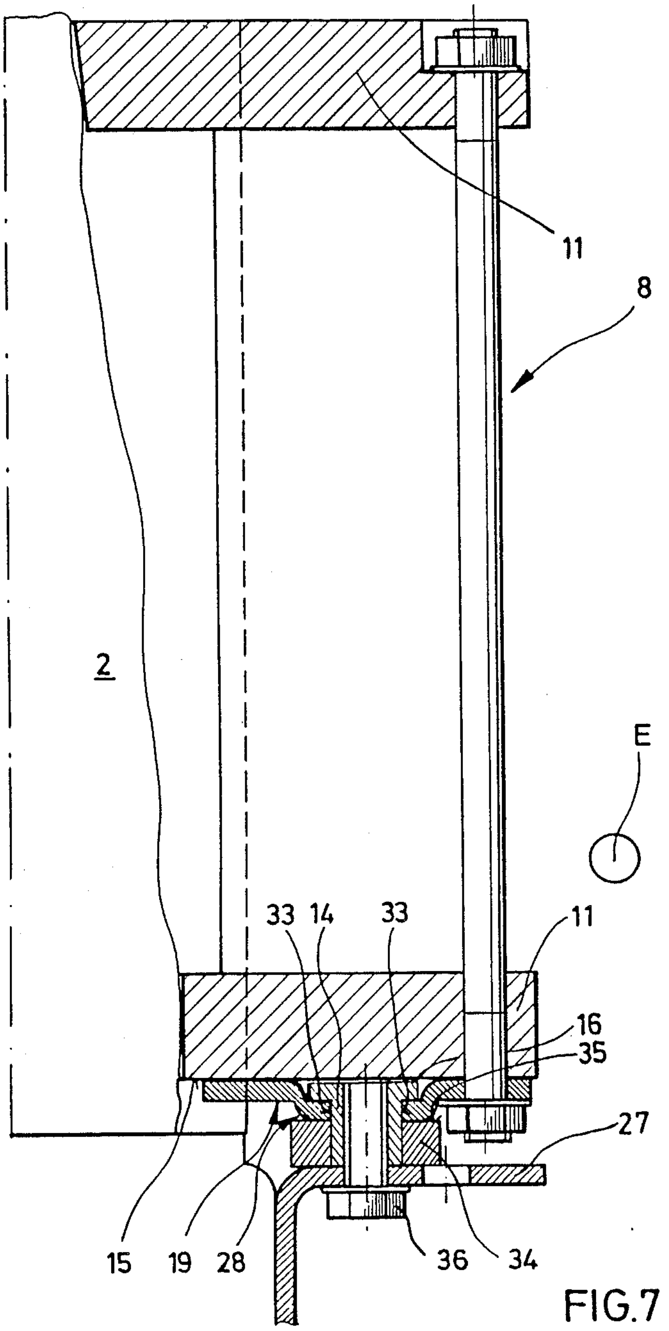
FIG. 7 is a sectional view taken through the receptacle handling machine of FIG. 1 along the line VII—VII.

The above-described assembled position of the individual insertion- and stop elements, namely plate 19 and collar bolt 14 fastened to an angular metal sheet 27 of the machine frame 13, is apparent from FIG. 7 which shows a sectional view through the arc-shaped guiding member 8 of FIG. 1.

Hereinafter, the individual insertion- and stop elements shall be described.

Figure 4:
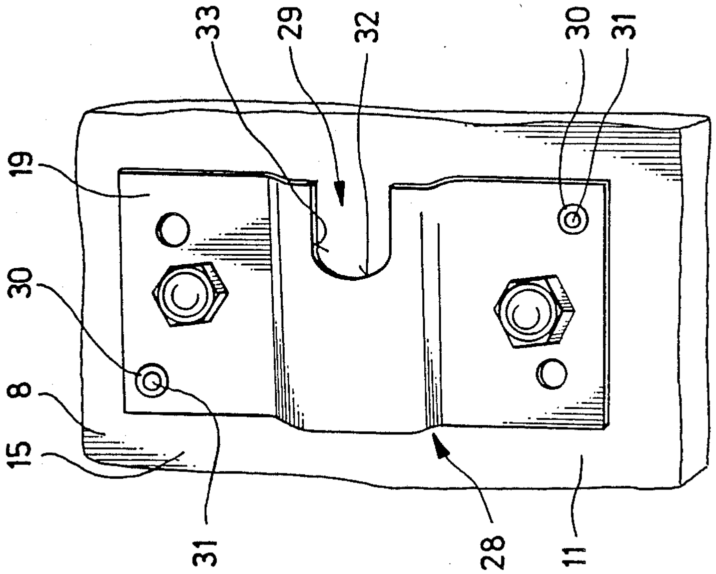
FIG. 4 is a top view, in perspective, of a fixed insertion- and stop element.

FIG. 4 shows plate 19 in its assembled state. It can be seen that plate 19 is provided in the form of a screw-down plate having a bead section 28. Bead section 28 has the effect that in this area the screw-down plate 19 is spaced from the bottom side 15 of the arc-shaped guiding member 8. In the region of the bead section, plate 19 is formed with a U-shaped insertion portion 29.

As can be further learnt from FIG. 4, in addition to the through-holes for the fastening screws, there are provided centering openings 30 to cooperate in the assembled state of the plates 19 with centering pins 31 embedded in the bottom side 15 of the arc-shaped guiding member 8.

Figure 6:
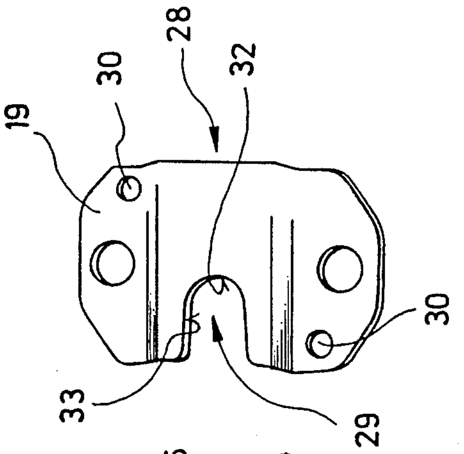
FIG. 6 is a top view of an insertion- and stop element similar to that shown in FIG. 4 but not assembled.

FIG. 6 shows a plate 19 similar to that shown in FIG. 4 whose insertion portion 29 has flanks 33 which converge towards the bottom 32 of the insertion portion. The flanks 33 are further provided with inclined insertion sections.

Figure 5:
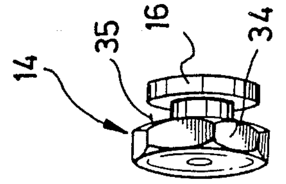
FIG. 5 is a perspective view of an insertion- and stop element designed as a counterpart for the insertion- and stop element illustrated in FIG. 4.

FIG. 5 shows a collar bolt 14 of substantially the same construction as the collar bolt described in the first embodiment. It follows, that this collar bolt also has a collar 16. Furthermore, at the end remote from the collar 16, collar bolt 14 has an external thread onto which a nut 34 is screwed whose face end directed to the collar 16 is formed as clamping shoulder 35.

As can be better seen from FIG. 7, the interior of collar bolt 14 is hollow and provided with an internal thread so that a fastening screw can be screwed thereinto.

It clearly appears from FIG. 7 that the bolt diameter between the collar 16 and the nut 34 is adapted to the horizontal distance between the flanks 33 of the insertion portion 29 in the direct vicinity of the bottom 32 of the insertion portion 29. In the case of the plate 19 shown in FIG. 4, the flanks are in fact always spaced at the same distance but this is not true for the plate 19 shown in FIG. 6, so that importance is attached to the dimension of the distance between the two flanks 33 in the direct vicinity of the bottom 32. The vertical distance between the collar 16 and the clamping shoulder 35 of the nut 34 of the collar bolt 14 corresponds to the thickness of the plate in the region of the insertion portion 29. These dimensions ensure that any relative movement of the arc-shaped guiding member 8 transversely to the direction of insertion E extending outwards from the drawing plane in FIG. 7, is prevented by the collar bolt 14 and the plate 19.

The arc-shaped guiding member 8 is assembled and disassembled in the same way as described for the above-mentioned embodiment and therefore, need not be depicted in more detail.

In principle, the plate 19 can also form an integral part of the bottom 11 of the arc-shaped guiding member 8.

Simple clamping screws 36 may also be taken into account as clamping members for securing the guide member 8 in a preset position.

Further embodiments are shown in FIGS. 8 to 15.

Figure 8:
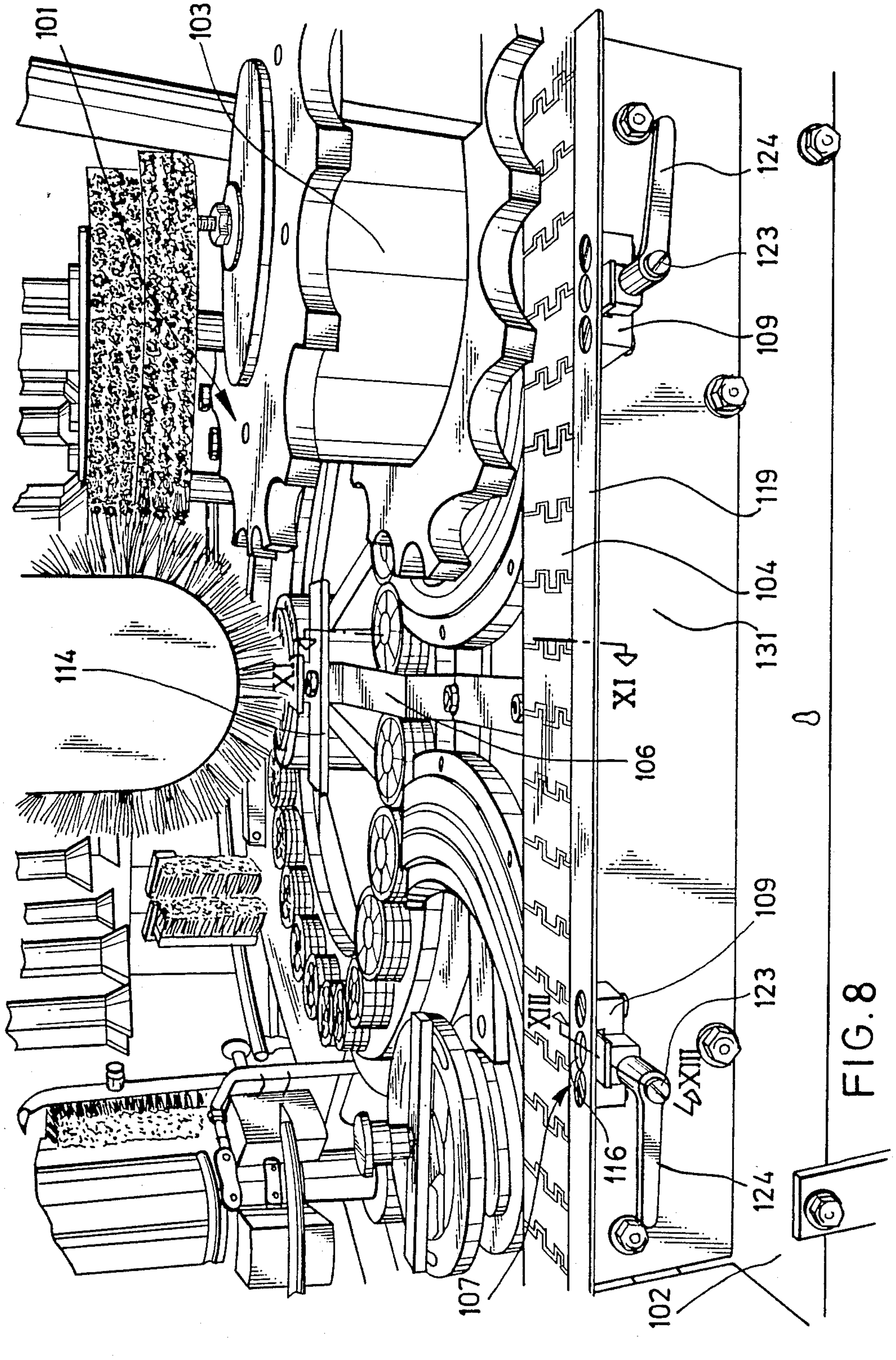
FIG. 8 is a perspective view from in front and above of a further embodiment of the receptacle handling machine according to the invention, a star-shaped wheel having been removed and the double arc-shaped guiding member being not illustrated.
Figure 9:
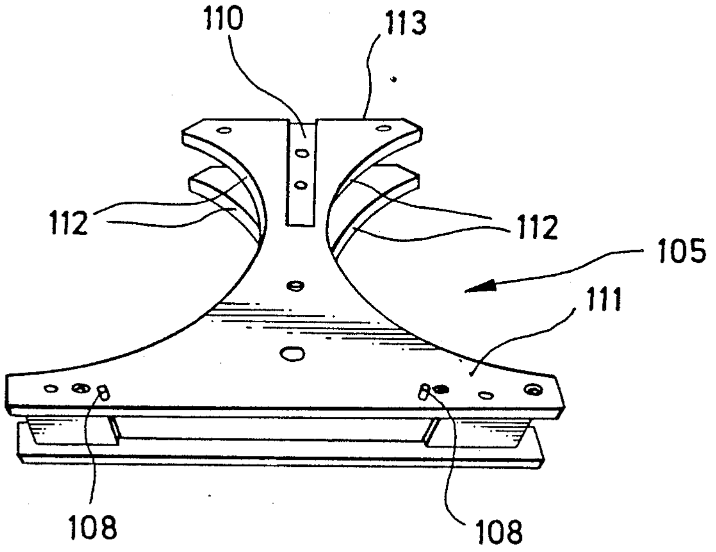
FIG. 9 shows, in perspective, a view upon the bottom side of a guiding body used in the receptacle handling machine illustrated in FIG. 8.

FIG. 8 shows in perspective a view taken from above and in front of a receptacle handling machine for the handling of receptacles passed through the machine. The machine comprises a machine frame 102 and two bottle stars 103 each mounted on the machine frame so as to be rotatable about a vertical axis and used for feeding and discharging individual receptacles to and from a rotary table of a receptacle handling machine, such as an inspecting-, filling- or labelling machine, with a labelling machine being shown in FIG. 8, one star-shaped wheel having been removed. A bottle conveyor belt 104 extending transversely to the viewing direction is provided in front to feed the receptacles to the rotary table and discharge them therefrom by means of the bottle stars 103. The receptacle handling machine further comprises a guiding body 105 which is releasably mounted on the machine frame 102 and has been removed in the illustration of FIG. 8; FIG. 9 shows a separate view of the guiding body 105 taken at an oblique angle from the bottom.

Figure 10:
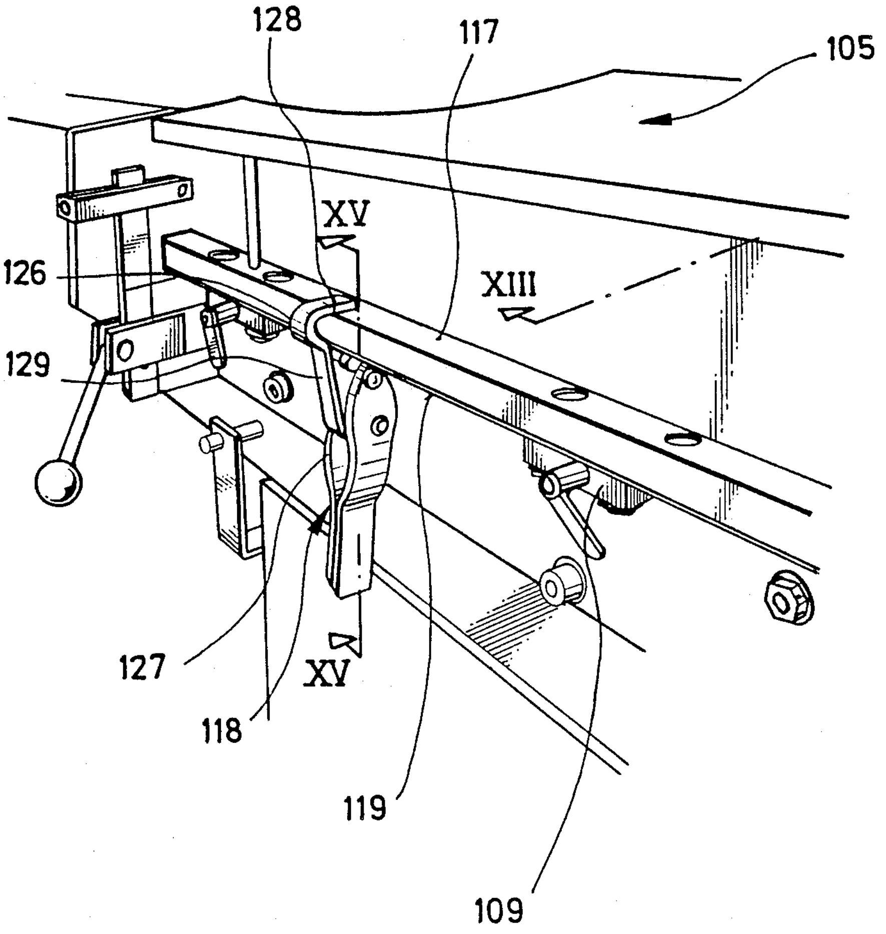
FIG. 10 is a view, in perspective, taken at an oblique angle from the side and from in front of the guiding body shown in FIG. 9 in the assembled state.
Figure 11:
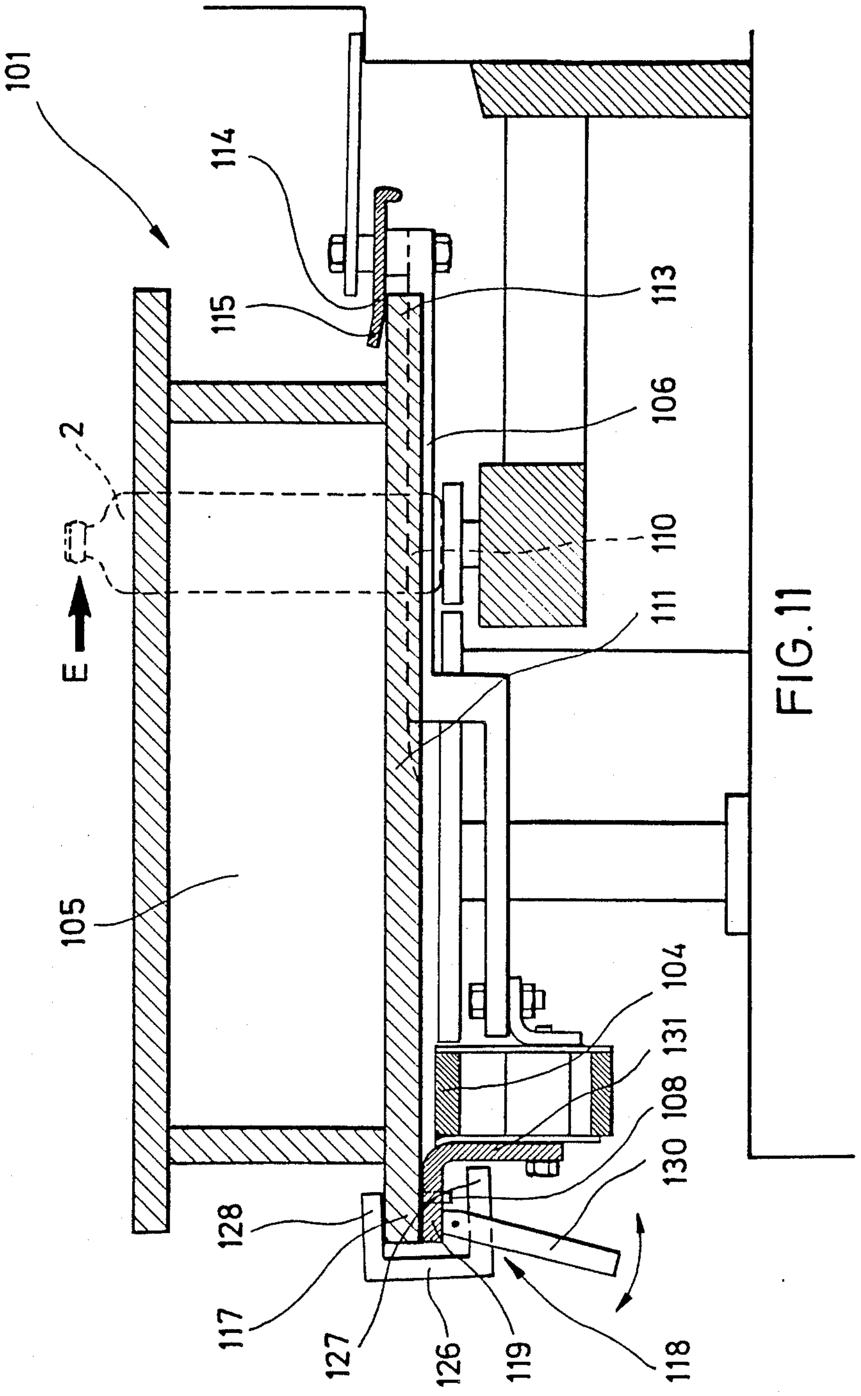
FIG. 11 is a sectional view through the receptacle handling machine of FIG. 8 taken along the line XI—XI, the arc-shaped guiding member being inserted.

FIG. 10 shows the guiding body 105 in its assembled state, and FIG. 11 represents a sectional view of the guiding body 105. Alternatively, FIG. 10 shows two different clamping elements 109 and 118.

It clearly appears from FIG. 8, that the machine frame 102 has attached thereto an insertion rail 106. On the machine exterior, the machine frame further comprises abutments 107 for centering elements 108 of the guiding body 105, and clamping elements 109.

On one side of the guiding body 105 the latter is provided with a slidably guiding section 110 cooperating with the insertion rail 106, while on the opposing side of the guiding body 105 the centering elements 108 are positioned. In the present case, the centering elements used simply represent centering spigots which project from the bottom side 111 of the guiding body 105.

As can be seen from the sectional view shown in FIG. 11, the guiding body 105 when assembled rests on insertion rail 106 with its one end and with its opposite end is held by at least one centering element 108 which positively engages the machine frame 102 or parts thereof. In addition, the guiding body 105 and the machine frame 102 are clamped together by means of at least one clamping element 109 or 118.

As further clearly appears from FIG. 9, the guiding body 105 comprises arc-shaped guiding members 112 whose radius of curvature is adapted to the adjacent bottle stars 103.

As FIG. 11 represents a sectional view these arc-shaped guiding members cannot be seen in the Figure. What is apparent, however, is that the guiding body 105 is forced against the insertion rail 106 with an inner edge 113 facing the machine centre in the direction of insertion E by means of a resilient angular holding down device 114 attached to the machine frame or, as in the present case, to the insertion rail 106 and open in a direction opposite to the direction of insertion E. The holding down device 114 has an inclined insertion section 115 which opens in a direction opposite to the direction of insertion E. The position of the guiding body 105 is fixed by a pair of centering spigots 108 which are attached to the bottom side 111 of the guiding body (cf. FIG. 9) and engage corresponding machine frame holes 16 of the abutments 107 mounted on the machine frame 102.

As is clearly apparent from FIG. 10, the outer edge 117 of the guiding body 105 which is directed to the machine exterior (opposite to the direction of insertion E) and the corresponding edge 119 of the machine frame 102 are clamped together by means of the clamping elements 109 or clamping elements 118.

Figure 12:
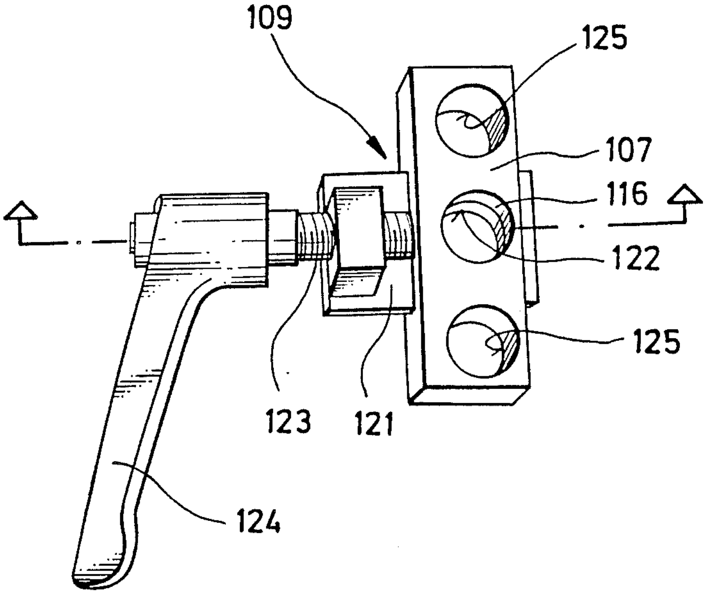
FIG. 12 shows an embodiment of the clamping element according to the invention, in a perspective bottom view.
Figure 13:
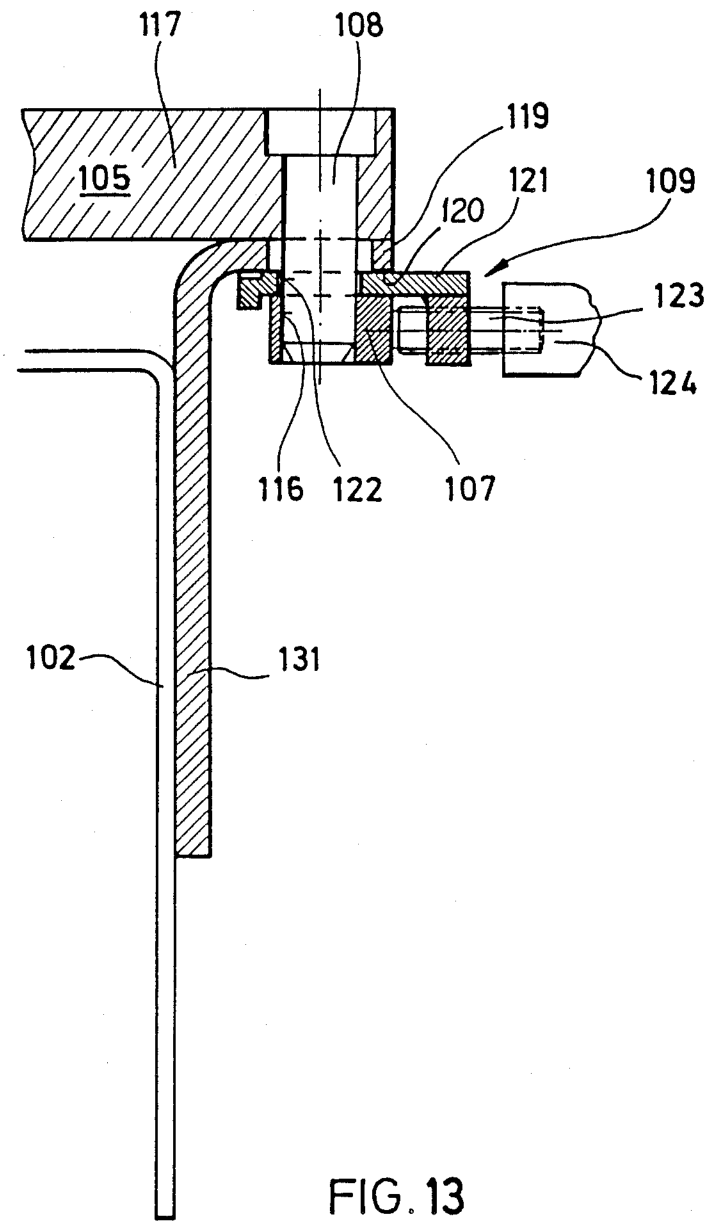
FIG. 13 shows the clamping element of FIG. 12 in a cross-sectional view when assembled as indicated by the line XIII—XIII in FIG. 8.

The clamping elements 109, which are particularly clearly shown in the FIGS. 8, 12 and 13, at the same time serve as abutments 107 for the centering spigots 108 and accordingly, are also provided with the hole 116 to receive the centering spigots 108.

The sectional view of FIG. 13 shows that the abutments 107 formed as clamping element 109 are provided with a through-hole 120 which extends through the abutment transversely to the hole 116 and includes a slide 121 which is shiftable transversely to the hole 116. The slide 121 has an opening 122 whose diameter corresponds to about the diameter of the hole 116 and which is in alignment with the hole 116 to receive a centering spigot 108.

The slide 121 consists of a metal sheet to which a block is soldered so that the slide assumes an angular configuration. An internal thread is provided in the block to receive a clamping screw 123. The clamping screw 123 mounted on the slide 121 extends in shifting direction and rests on the abutment 107 with the free end thereof. A handle 124 is secured to the opposite end of the clamping screw 123 to rotate with the clamping screw 123.

To actuate slide 121, clamping screw 123 may be also replaced by an eccentric which rests on the abutment 107.

As particularly clearly appears from the FIGS. 8 and 12, the abutment includes two further holes 125 in addition to hole 116, holes 125 being used for screwing the abutment onto the edge 119 of the machine frame 102. It is also possible, however, to fasten the abutment 107 to the machine frame edge 119 in any other way, for example by welding.

Figure 14:
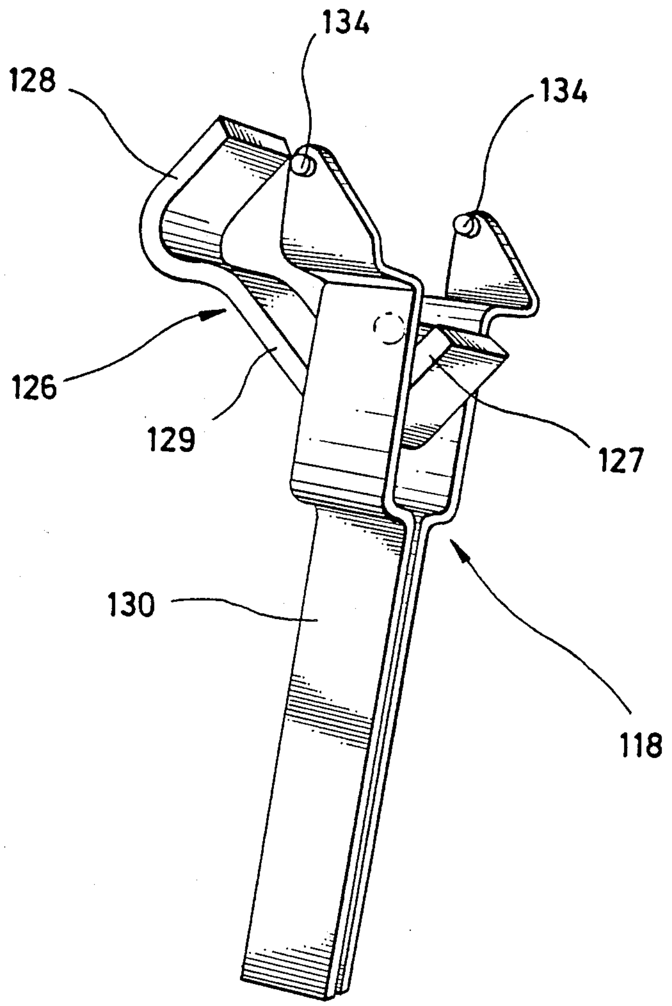
FIG. 14 shows a further embodiment of a clamping element according to the invention, in perspective.
Figure 15:
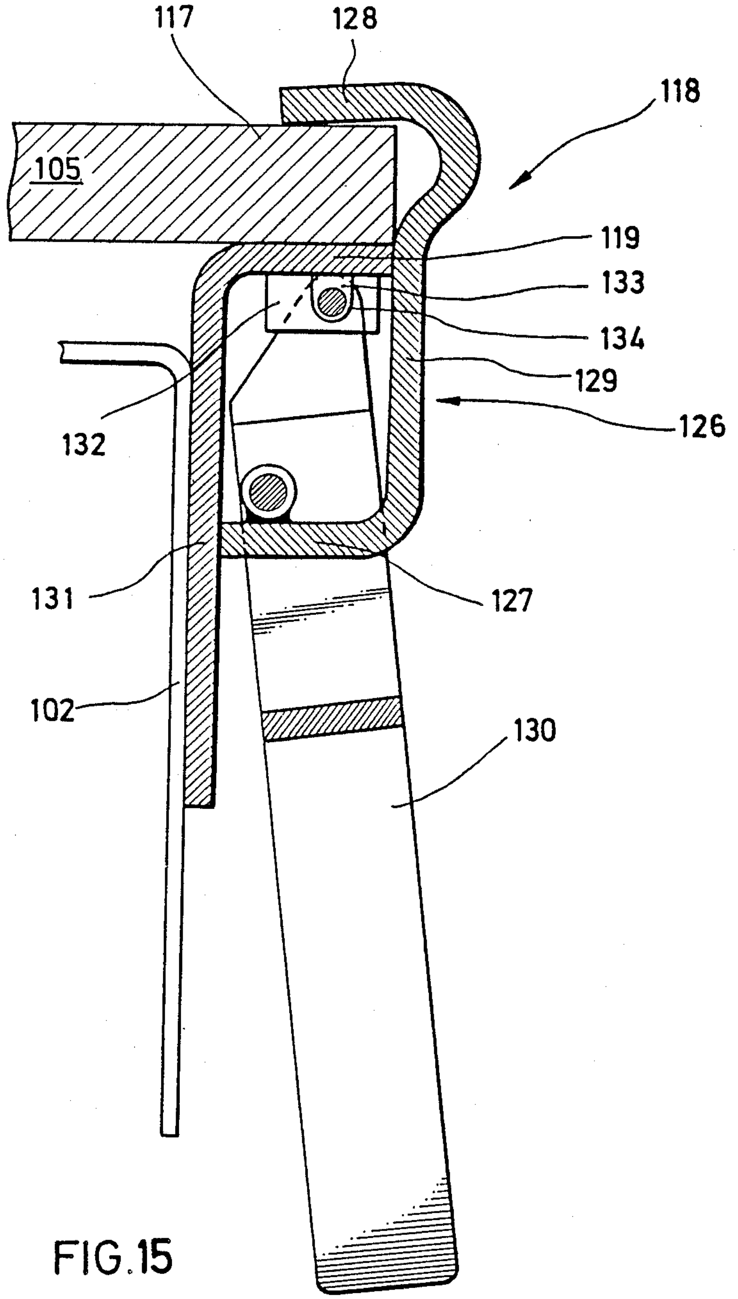
FIG. 15 shows the clamping element of FIG. 14 in a cross-sectional view when assembled as indicated by the line XV—XV in FIG. 10.

FIGS. 10, 14 and 15 clearly show the further clamping element 118 which can be used as an alternative to the clamping element 109. The clamping element 118 is a knee lever assembly which comprises a U-shaped clamp 126 having two horizontal free legs 127 and 128 and a web portion 129 interconnecting the two legs. The U-shaped clamp 126 encompasses the two edges 117 and 119 of the guiding body 105 and the machine frame 102, respectively, lying one on top of the other. A clamping lever 130 is supported by the lower free leg 127 to force in clamping position the two edges 117 and 119 together against the upper leg 128 of the U-shaped clamp 126. As shown in FIG. 15, the clamping lever 130 is pivotably mounted in such a manner that the clamping element 118 does not reach its clamping position until a maximum load lever position is exceeded. The result is a knee lever effect which always urges the clamping lever into the clamping position thus excluding the danger of an unintended loosening of the clamping element 118.

The clamping element 118 is held in clamping position by means of a stop at the machine frame.

In the embodiment shown, this is attained by the characteristic that the lower U-shaped leg 127 is supported by a flange 131 directed downwards from the edge 119 of the machine frame.

To fasten the clamping element 118 a bearing block 132 is screwed onto the bottom side of the edge 119 of the machine frame 102, the bearing block 132 having a receiving section 133 to allow a height motion of the clamping lever 130. Bearing spigots 134 of the clamping lever 130 project into the receiving section 133. On the one hand, this has the effect that also in the loosened state, the clalmping element 118 is held at the machine frame 102 and, on the other hand, that the clamping effect of the clamping element 118 is prevented from being disadvantageously influenced.

On the basis of the description of the assembly and disassembly, it shall hereinafter be depicted in more detail how the above-described assembly operates.

Before the guiding body 105 is built in, the receptacle handling machine 101 is in the state shown in FIG. 8, the rotatable bottle star 103, which has been only included in the drawing for the sake of clarity, having been removed. The guiding body shown in FIG. 9 is used for insertion into the receptacle handling machine and turned bottom side down, so that its bottom side 111 will, in fact, contact the machine frame top. According to the direction of insertion E shown in FIG. 11, the slidably guiding section 110 of the guiding body 105 is then pushed onto the insertion rail 106 and, in fact, is pushed to such an extent that the guiding body edge 113 facing the machine centre moves below the resilient holding down device 114.

In this position, the edge 117 of the guiding body 105 directed to the machine exterior is still slightly raised and, in fact, is raised until the guiding spigots 108 are at the same height as the holes 116 of the abutment 107. Then also the rear edge 117 of the guiding body 105 is lowered, so that the centering spigots 108 move into the holes 116 of the abutment 107.

In the case of the first variant of the invention, where the abutments 107 at the same time constitute the clamping elements 109, now only the handles 124 of the clamping screws 123 require to be swung, so that the holes 122 of the slides 121 move with respect to the holes 116 and thus clamp the spigots 108. With this step, the assembly of the guiding body 105 is already terminated. The guiding body 105 is now positively connected to the machine frame 102 of the receptacle handling machine 101 in all degrees of freedom. The two bottle stars 103 are now mounted as usual.

To disassembled the guiding body 105, the sequence of the steps involved is reversed i.e. after the clamping screw 123 has been loosened, the rear edge 117 of the guiding body 105 is lifted and the guiding body 105 is removed towards the machine exterior.

In the case of the second variant of the invention, where the knee lever-type clamping elements 118 are employed, the guiding body 105 is likewise pushed onto the insertion rail 106 until the centering elements 108 engage holes 116. The upper free leg 128 of the clamp 126 is then first swung onto the rear edge 117 of the guiding body 105 and afterwards, the clamping lever 130 is pressed downwards towards the machine until the lower leg 127 abuts against flange 131 and the clamping element 118 snaps into its clamping position. As the clamping lever 130 is eccentrically mounted, in the clamping position the latter substantially maintains its state substantially directed vertically downwards. The end of the clamping lever 130 facing downwards at the same time serves as a handle.

The invention is no restricted to the guiding bodies shown and described here. On the contrary, it is also possible to likewise fasten guide rails or other compact things to be built in of a receptacle handling machine to the machine frame.

I claim:

1. A receptacle handling machine for the handling of receptacles which are passed through the machine comprising:

a machine frame (13) including a transverse extent, a longitudinal extent, a top side, a center portion, a preset position, and at least one second insertion and stop element (17, 19) having a second transverse stop means, and a second longitudinal stop means set at predetermined distances from said preset position;

at least one receptacle guiding body (7, 8) adapted to be moved in a direction of insertion (E) to said preset position and clamped on said machine frame or unclamped and removed from said machine frame, said guiding body including a bottom side, at least one first insertion and stop element (14) having a first transverse stop means and a first longitudinal stop means set at said predetermined distances when said guiding body is at said preset position;

wherein one of said insertion and stop elements is provided with a substantially U-shaped insertion portion having undercut edges and the other of said insertion and stop elements comprises a bolt having a collar, said bolt having a diameter adapted to fit in the width of said insertion portion of the associated first or second insertion and stop elements and whose collar is larger than said bolt diameter to fit behind the undercut edges of said insertion portion when said guiding body is in an assembled state on said machine frame;

said guiding body (7, 8), when inserted on said frame, having each of said first transverse and longitudinal stop means in contact with said second transverse and longitudinal stop means to precisely position said guiding body in said preset position; and a releasable clamping member (21) mounted between said guiding body and said machine frame for clamping and holding said guiding body first transverse and longitudinal stop means against both of said machine frame second transverse and longitudinal stop means to prevent transverse and longitudinal play therebetween.

2. A receptacle handling machine according to claim 1, wherein each of said insertion and stop elements (14, 17, 19) are respectively constructed as one piece.

3. A receptacle handling machine according to claim 1, wherein said first insertion and stop elements (14) are disposed on said bottom side (15) of said guiding body (7).

4. A receptacle handling machine according claim 1, wherein said second insertion and stop elements (17, 19) is mounted on said top side of said machine frame (13).

5. A receptacle handling machine according to claim 1, wherein said guiding body (7) is provided with at least two spaced apart insertion and stop elements (14).

6. A receptacle handling machine according to claim 1, wherein said guiding body (7) is provided with three spaced apart insertion and stop elements (14).

7. A receptacle handling machine according to claim 1, wherein one of said insertion and stop elements (17, 19) is in the form of a screw-down plate which is bent at right angles with respect to the said undercut edges (20, 33) of said insertion portion (29) thus forming the undercut of said edges.

8. A receptacle handling machine according to claim 1, wherein one of said insertion and stop elements (17, 19) is formed in one piece and mounted on the bottom side of said guiding body or the top side of said machine frame.

9. A receptacle handling machine according to claim 1, wherein said collar (16) is spaced from said bottom side of said guiding body a distance substantially corresponding to the thickness of said edges (20, 33) of said insertion portion (17, 29), and said collar bolt (14) has a clamping shoulder (35) which contacts said undercut edges (20, 33) of said insertion portion (17, 29) in the assembled state of said guiding body (7, 8).

10. A receptacle handling machine according to claim 9, wherein said collar bolt has an outer end which is threaded and said clamping shoulder (35) comprises the end face of a nut (34) threaded onto said threaded end of said collar bolt (14).

11. A receptacle handling machine according to claim 10, wherein said collar bolt (14) has a continuous internally threaded bore.

12. A receptacle handling machine according to claim 1, wherein said clamping element (21) comprises a clamping screw (22) including an axis aligned in said direction of insertion (E) of said guiding body (7, 8) and a clamping disc (25) having a release position out of contact with said guiding body and a locking position in contact with said guiding body eccentrically mounted thereon relative to said screw axis, said clamping element mounted for pivotal movement about said screw axis from said release position to said locking position in contact with said guiding body (7, 8) to positively hold said guiding body on said direction of insertion (E).

13. A receptacle handling machine according to claim 12, wherein said clamping screw (22) has a hand lever (24) fixedly mounted thereon, wherein said clamping disc (25) is rotatably mounted on said clamping screw (22) for rotation therewith, and a stop pin (26) contactable by said clamping disc for preventing a full turn of said clamping disc.

* * * * *